Sept. 8, 1942.  C. E. TACK  2,295,244
RAILWAY BRAKE
Filed Aug. 21, 1941  2 Sheets-Sheet 1
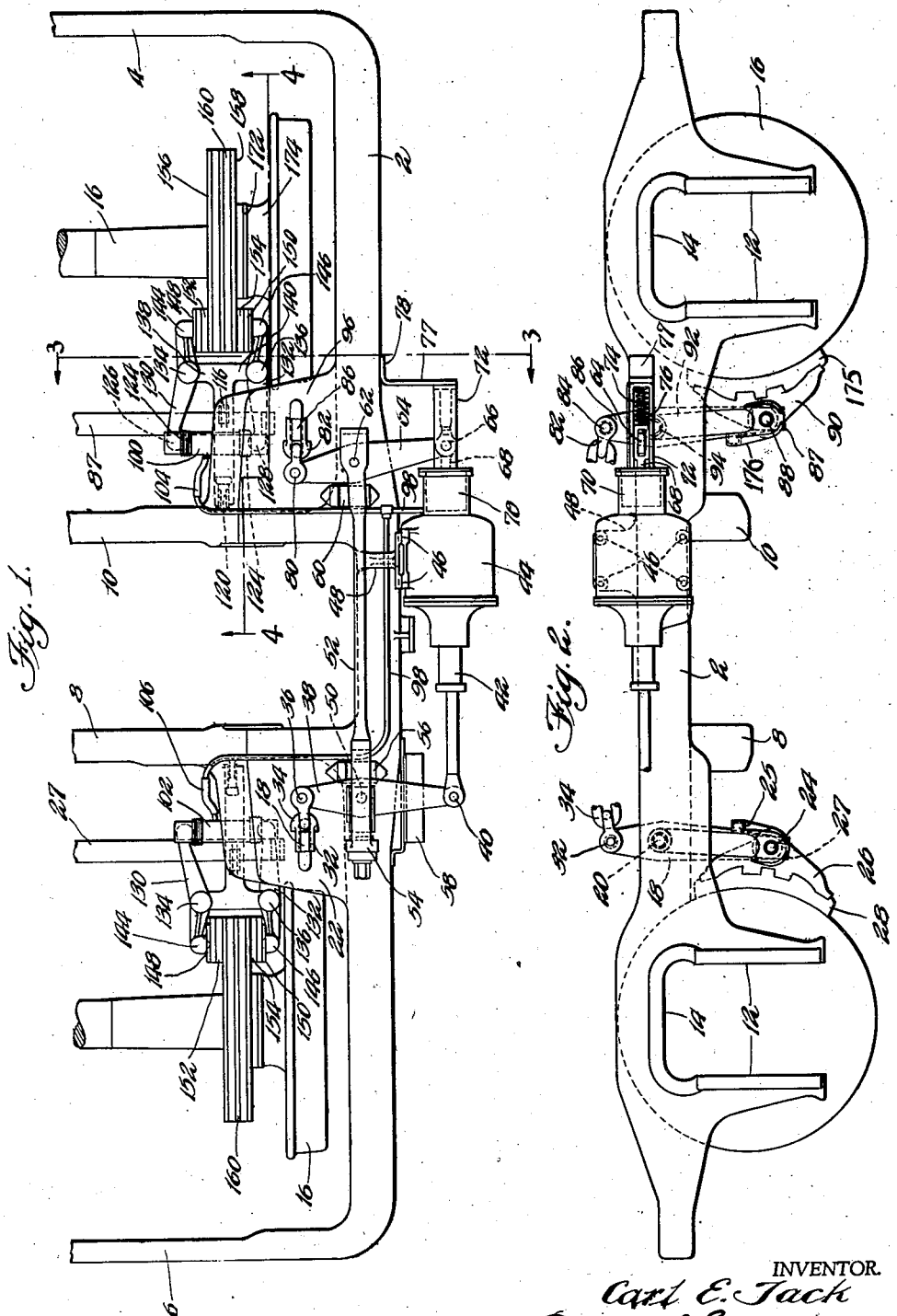
INVENTOR.
Carl E. Tack
BY
ATTY.

Sept. 8, 1942.　　　　　C. E. TACK　　　　　2,295,244
RAILWAY BRAKE
Filed Aug. 21, 1941　　　　2 Sheets-Sheet 2

INVENTOR.
Carl E. Tack
BY
ATTY.

Patented Sept. 8, 1942

2,295,244

UNITED STATES PATENT OFFICE 2,295,244

RAILWAY BRAKE

Carl E. Tack, Chicago, Ill., assignor to American Steel Foundries, Chicago, Ill., a corporation of New Jersey Application August 21, 1941, Serial No. 407,719

16 Claims. (Cl. 188—33)

My invention relates to brake rigging for a railway car truck.

For many years the principal method of braking railway rolling stock has involved the application of brake shoes to the tread surfaces of the wheels. In recent years certain designs of off-wheel brakes have been utilized, sometimes described as disc or rotor brakes, wherein a member such as a disc is mounted to rotate with the wheel or axle and braking forces are applied to certain surfaces thereon. In such brakes it has been found desirable to utilize composition brake lining, in the rotor or disc brakes said lining sometimes being supported on the shoes arranged for engagement with the braking surface on the disc and sometimes being mounted on stator discs which may be interleaved with rotor discs.

A characteristic or well known phenomenon peculiar to composition brake lining is a lowering of the friction coefficient as the speed decreases. In other words, when composition brake lining is utilized the coefficient of friction is sharply reduced as the speed approaches zero and this fade (as it is commonly described) is is considered particularly undesirable for railway use since it makes it difficult accurately to stop a train and moreover it tends to lengthen a stop at the most critical point of an emergency.

The contrary is true of metal to metal braking surfaces such as are more commonly used on railway equipment at the present time. In other words, the coefficient of friction in metal to metal contact rises as the speed is reduced and this at times tends to cause wheel slippage unless the braking pressure is reduced somewhat with reduction of speed.

I have conceived the desirability of utilizing in conjunction the two types of braking surfaces in order to secure the advantages of both and at the same time eliminate, to a degree at least, the disadvantages which normally accompany the use of either alone. By this means I am able to produce a relatively smooth torque curve as compared with the torque curve which will be produced in utilizing either of the above types of brake by itself.

The general object of my invention is to devise a novel form of brake arrangement utilizing metal to metal friction surfaces in conjunction with metal and composition braking surfaces in order to secure the advantages of both types of brakes and eliminate the disadvantages associated with each.

A specific object of my invention is to devise a brake arrangement wherein brake heads and brake shoes may be applied to certain of the wheel treads and simultaneously therewith disc type brakes may be operated or actuated, said disc type brakes utilizing composition brake lining of the type already referred to.

Another object of my invention is to devise a practical form of hydraulic connection between the metal to metal wheel brake of usual type and a novel form of disc brake operated in conjunction therewith.

Yet another object of my invention is to devise a brake arrangement such as that described wherein the power means will be mounted directly on the car truck which is to be braked in an arrangement sometimes described as a unit cylinder application.

In the drawings,

Figure 1 is a top plan view of a railway truck and brake arrangement embodying my invention, only one-half of the truck and brake arrangement being shown inasmuch as the structure is similar at opposite sides of the truck.

Figure 2 is a side elevation of the truck and brake arrangement shown in Figure 1.

Figures 3, 4:
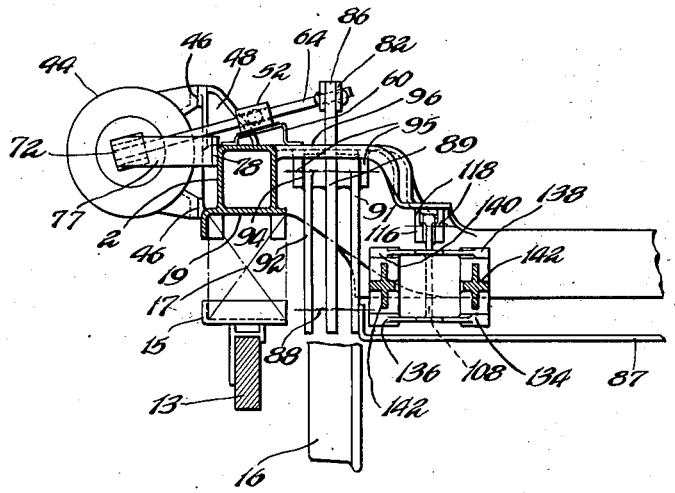
Figure 3 is a sectional view taken substantially in the transverse vertical plane indicated by the line 3—3 of Figure 1.
Figure 4 is a further sectional view taken approximately in the longitudinal planes indicated by the line 4—4 of Figure 1.

In each of the figures certain details may be omitted where they are more clearly set forth in other associated views.

Describing the structure in detail, my novel arrangement comprises a frame of usual form including the side member 2, the end rails 4 and 6, as well as the spaced transoms 8 and 10 integral therewith, said transoms affording the usual means of support for a load carrying member (not shown) interposed therebetween as a bearer for the car body which may be superposed thereon. The side rail 2 is formed adjacent each end with spaced pedestals 12, 12 defining the pedestal openings 14, 14 forming a usual means of connection to journal boxes (not shown) associated with the supporting wheel and axle assemblies 16, 16. Supported on the journal boxes may be the usual form of equalizer 18 (Figure 3) on which may be mounted adjacent each end of the truck a spring seat 15 and said spring seat may afford support for a spring group diagrammatically indicated at 17, the upper end of which may seat as at 19 within a socket formed on the bottom of the side member 2.

My novel brake rigging comprises the composite hanger lever 18 (Figure 2 left) pivotally supported as at 20 from the gusset 22 forming an integral part of the frame at the juncture of the transom 8 and the side rail 2. The lower end of said hanger lever 18 has a pivotal connection as at 24 to the brake head 26, the pivotal connection of the brake head 26 at the point 24 being controlled by the balancing means 25 of well known form, and on said head may be mounted the usual brake shoe 28 for braking engagement with the tread surface of the adjacent wheel. Also connected at the pivot point 24 is one end of the hanger lever connector or tie strap 27, the opposite end of which may have similar connection at the opposite side of the truck. The upper end of the hanger lever 18 has a pivotal connection as at 32 with the clevis means 34, the opposite end of said clevis means having a pivotal connection as at 36 to the inner end of the live cylinder lever 38, said cylinder lever 38 being arranged transversely of the truck and having its opposite end pivotally connected as at 40 to the piston 42 of the power means or air cylinder 44, said power means being mounted as at 46, 48 on the bracket 48 integrally formed with the side rail 2 adjacent its juncture with the transom 10. Intermediate the ends of the live cylinder lever 38 may be pivotally connected as at 50 the pull rod 52, the connection at 50 being made adjustable by means of the manual slack adjuster 54, said pull rod 52 having slidable support by means of the strap 56 mounted on the frame therebelow, and said lever 38 having slidable support as from the bracket 58 mounted on the side rail 2 outwardly thereof. The opposite end of the pull rod 52 may be slidably supported from the strap 60 (Figure 3) and may have pivotal connection intermediate its ends as at 62 with the dead cylinder lever 64 whose outer end may be adjustably fulcrumed as at 66 from the piston 68 associated with the hydraulic master cylinder 70 which may be mounted on the power cylinder 44. Associated with the master cylinder 70 is the frame 72 within which the piston 68 may be slidably confined and the tension spring 74 may be connected to the piston as at 76 to serve as release means therefor. The frame 72 may be stabilized by the bracket 77 fixed to the frame as at 78.

The inner end of the dead cylinder lever 64 may have pivotal connection as at 80 with the clevis means 82 and the opposite end of said clevis means may have a pivotal connection as at 84 to the composite hanger lever 86. The lower end of the composite hanger lever 86 has a pivotal connection as at 88 with the brake head 90 which supports the brake shoe 175 for engagement with the periphery of the adjacent wheel, and the head 90 may be maintained in proper position by the balancing means 176 also mounted at the pivot point 88 in well known manner. Also connected at the pivot point 88 is the connecting strap 87, the opposite end of which may have similar connection at the other side of the truck. The hanger lever 86, as well as the previously referred to hanger lever 18, is of the form best seen from a consideration of the sectional view of Figure 3 where it may be seen that said hanger lever 86 comprises an intermediate main stem or lever 89 as well as inboard and outboard hangers 91 and 92 integrally formed therewith, said main stem as well as both of said hangers having pivotal connection at 88 with the before-mentioned brake head 90. The hanger lever 86 may be supported at the pivot point 94 from the spaced lugs 96, 96 integrally formed with the gusset 96 forming a part of the frame at the juncture of the transom 10 with the side rail 2. The hydraulic master cylinder 70 may be filled with any suitable fluid and pressure lines 98, 98 may conduct said fluid from said master cylinder to hydraulic power cylinders 100 and 102, flexible connections being afforded in the lines 98, 98 as at 104 and 106 adjacent said hydraulic power cylinders in order to accommodate relative movement of said cylinders with respect to the wheel and axle assemblies and with respect to the frame.

The brake riggings associated with the respective hydraulic power cylinders are substantially identical and may be described as follows. The power cylinder may be integrally formed with a frame generally designated 108 the shape of which is best seen from a comparison of the views of Figures 1, 3, and 4. Said frame 108 has a longitudinal body portion 110 flanged therearound and formed with the top bracket 112 and an end bracket 114, said top bracket having connection as at 116 to the spaced lugs 118, 118 depending from the gusset 96 and said end bracket 114 having a connection as at 120 with the bracket 122 integrally formed on the side of the transom 10. The connections at 116 and 120, affording support for the frame 108, are constructed to permit some lateral motion of the frame 108 with respect to the truck frame proper in order to accommodate lateral movement of the braking means associated with the wheel and axle assembly. Each hydraulic power cylinder 100 is arranged transversely of the truck being cast integral with the frame member 108, each of said power cylinders being double acting with the respective piston heads in proximity with each other when the brakes are released. Each end of the hydraulic power cylinder is afforded a convex closure means 124 of telescopic form and designed to exclude extraneous matter. The pistons at opposite ends of the hydraulic power cylinder have connection as at 126 and 128 with the levers 130 and 132 and said levers are fulcrumed as at 134 and 136 respectively from arms 138 and 140 oppositely formed on the frame 108 at one extremity thereof. Each of the levers 130 and 132 has a relatively heavy section outwardly of its fulcrum point, a cross-section of which is shown at 142 (Figure 3), and the extremities of said levers 130 and 132 have pivotal connection as at 144 and 146 with the respective brake heads 148 and 150 on which may be mounted brake shoes 152 and 154, said shoes being disposed opposite each other and in abutment with the annular braking surfaces 156 and 158 formed at opposite sides of the brake disc 160, said disc 160 having a metal braking surface and said shoes being faced with composition brake lining in engagement with the metal braking surface of said disc. The form of connection of each lever arm with the associated shoe is well illustrated in Figure 4 where it may be noted that the pivot pin 162 may have its lower end recessed in a socket adjacent the bottom of the brake head and its upper end secured in a similar socket adjacent the top of the brake head by means of the retaining plate 164, and the intermediate portion of the retaining pin 162 is received within the sleeve-like end member 166 integrally formed at the extremity of the lever.

The brake shoes 152, 154 are of special form as well illustrated in the view of Figure 4 where it may be noted that each shoe has the general plan of a ring segment and the midpoint of the inner edge of the shoe is in substantial alignment as at 168 with the inner perimeter of the adjacent braking surface 158, while the midpoint of the outer edge of the shoe is in substantial alignment with the outer perimeter of said surface 158 as indicated at 170. The opposite edges of the shoe above and below the middle line thereof may then be described by arcs struck from centers X and Y above and below the wheel axis as illustrated in Figure 4. Such a form of shoe may rove about on the surface of the braking disc and have some vertical and lateral movement with respect thereto without leaving the surface of the disc and by this means the wearing surface of the disc may be maintained in smooth condition without the development of grooves which otherwise occur when the position of the shoe is fixed with respect to the disc it engages.

Each braking disc 160 may be fixed as at 172 (Figure 1) on the enlarged hub 174 formed on the inboard face of the adjacent wheel and concentric therewith.

Safety means for the brake rigging intermediate the wheels is afforded by the before-mentioned straps 27 and 87 which extend between the hanger levers at opposite sides of the truck and underlie the brake rigging intermediate the wheels as best seen in the sectional view of Figures 3 and 4.

In operation actuation of the air cylinder 44 causes the piston 42 to move to the left, thus rotating the live cylinder lever 38 in a clockwise direction about the pivot 50 intermediate its ends and applying the brake shoe 28 to the periphery of the adjacent wheel by actuation of the hanger lever 18. At the same time, movement of the pull rod 52 to the left causes movement or translation of the dead cylinder lever 64 also to the left as well as counter-clockwise rotation thereof about the pivot 66 at its outer end thus applying the brake shoe 92 by actuation of the hanger lever 86. With the wheel brakes applied as already described, the fluid in the hydraulic master cylinder 70 is under pressure substantially equivalent to that developed in the air cylinder 44 and said fluid pressure is conducted by the lines 98, 98 into the hydraulic power cylinders 100 and 102. Each of the hydraulic power cylinders is actuated independently so that its double pistons are moved outwardly thus rotating the associated levers 130 and 132 respectively in clockwise and counter-clockwise directions as viewed in Figure 1 right and applying the brake shoes 152 and 154 to the braking faces 156 and 158 at opposite sides of the disc or rotor 160. Release of the power means 44 will cause the piston 42 to move in the reverse direction thus releasing the wheel brakes and at the same time reducing or substantially eliminating the pressure in the hydraulic master cylinder so that the release spring 74 may operate to restore the piston 68 of the hydraulic master cylinder to normal position thus simultaneously releasing the rotor brake. It will thus be seen that I have devised a wheel brake operable in conjunction with a rotor type of brake and means for actuating the two simultaneously so that the advantages of both types of brakes may be utilized in a single application while at the same time largely eliminating the disadvantages of both.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a composite brake arrangement for a railway car truck, a frame, spaced supporting wheel and axle assemblies, wheel brakes comprising a metal brake shoe supported for engagement with the periphery of each wheel, disc brakes comprising a brake disc supported on each axle adjacent each wheel thereof with composition lined shoes for engagement with opposite faces thereof, brake rigging associated with said disc brakes and with said wheel brakes respectively, power means at opposite sides of said frame for simultaneous actuation of the brakes at respective sides of the truck, each of said power means comprising an air cylinder, a hydraulic master cylinder associated with said air cylinder, a hydraulic power cylinder associated with each of said discs, the wheel brakes at each side of the truck comprising hanger levers supporting the shoes associated with respective wheels and live and dead cylinder levers connected at corresponding ends to said hanger levers, connected intermediate their ends to each other, and connected at their outer ends respectively to the piston of said air cylinder and the piston of said master cylinder, and fluid connections between said master cylinder and said hydraulic power cylinders affording simultaneous actuation of said power cylinders with actuation of said master cylinder.

2. In a railway car truck, a frame, spaced supporting wheel and axle assemblies, and braking means for one side of the car truck comprising a metal brake shoe supported for engagement with the periphery of each wheel, a brake disc associated with each wheel and having composition lined brake shoes supported for engagement with braking faces at opposite sides thereof, and means on said frame for simultaneous actuation of all of said brake shoes, said last-mentioned means comprising an air cylinder, a hydraulic master cylinder associated with said air cylinder, hydraulic power cylinders associated with each of said discs, interconnected live and dead cylinder levers connected at corresponding ends to the piston of said air cylinder and the piston of said master cylinder, operative connections between the opposite ends of said cylinder levers and said metal brake shoes, means connecting the fluid chambers of said master cylinder and said power cylinder, said air cylinder being operable to actuate said cylinder levers, and said dead cylinder lever reacting against the piston of said master cylinder for simultaneous actuation of said brake shoes associated with said discs.

3. In a brake arrangement for a railway car truck, a frame, a supporting wheel and axle at each end thereof, brake discs on respective axles associated with the wheels at one side of the truck, hanger levers hung from said frame and supporting metal brake shoes for engagement with the peripheries of respective wheels at one side of the truck, dead levers hung from the frame and supporting composition lined brake shoes for engagement with braking faces at opposite sides of each brake disc, and power means at the side of the truck for simultaneous actuation of all of said brake shoes, said power means comprising an air cylinder with a piston, a hydraulic master cylinder with a piston, interconnected live and dead cylinder levers having corresponding ends connected to said pistons respectively and their opposite ends connected to said hanger levers for operation thereof, actuation of said air cylinder causing said dead cylinder lever to react against the piston of said master cylinder, hydraulic power cylinders associated with each of said brake discs, and fluid connections between said master cylinder and said power cylinders for actuation of the latter from said master cylinder.

4. In a brake arrangement for a railway car truck, a frame, spaced supporting wheel and axle assemblies, power means on a side of said frame, a hydraulic cylinder mounted on one end of said power means, and brake rigging comprising hanger levers supported at one side of each wheel, live and dead cylinder levers connected respectively to the pistons of said power means and said hydraulic cylinder, connected intermediate their ends to each other, and connected at their inner ends to said hanger levers respectively, a brake disc mounted on each of said wheel and axle assemblies adjacent a wheel thereof, hydraulic power cylinders mounted on said frame adjacent said discs respectively, a pressure line connecting all of said hydraulic cylinders, each of said hydraulic power cylinders having oppositely acting pistons, and dead levers fulcrumed intermediate their ends and connected at corresponding ends to respective pistons of the associated hydraulic power cylinder and supporting at their opposite ends brake shoes for engagement with opposite faces of the associated brake disc.

5. In a brake arrangement for a railway car truck, a truck frame, a supporting wheel and axle, a brake disc on said axle adjacent said wheel, a metal brake shoe supported for engagement with the periphery of said wheel, composition lined brake shoes supported for engagement with braking faces at opposite sides of said disc, and power means on said frame for simultaneous actuation of all of said shoes, said power means comprising an air cylinder mounted on said frame, a hydraulic cylinder associated therewith, the piston of said air cylinder being operable to actuate the metal brake shoe associated with said wheel and to react against the piston of said hydraulic cylinder for simultaneous actuation of the brake shoes associated with said disc.

6. In a brake arrangement for a railway car truck, a frame, a supporting wheel and axle, a brake disc on said axle adjacent said wheel, a metal brake shoe supported for engagement with the periphery of said wheel, a composition lined brake shoe supported for engagement with a braking face on said disc, and power means on said frame for simultaneous actuation of both of said shoes, said power means comprising an air cylinder, a hydraulic cylinder associated therewith, actuation of the piston of said air cylinder applying said metal brake shoe against said wheel and reacting against the piston of said hydraulic cylinder for simultaneous actuation of said shoe associated with said disc.

7. In a composite brake arrangement for a railway car truck, a frame, spaced supporting wheel and axle assemblies, wheel brakes comprising a metal brake shoe supported for engagement with the periphery of each wheel, disc brakes comprising a brake disc supported on each axle adjacent each wheel thereof with composition lined shoes for engagement with opposite faces thereof, brake rigging associated with said disc brakes and with said wheel brakes respectively, and power means at opposite sides of said frame for simultaneous actuation of the brakes at respective sides of the truck, each of said power means comprising an air cylinder, a hydraulic cylinder adjacent thereto, interconnected live and dead cylinder levers connected respectively to the pistons of said cylinders, and connections between said cylinder levers and said wheel brakes at opposite ends of the truck.

8. In a brake arrangement for a railway car truck, a frame, spaced supporting wheels and axles, brake discs mounted on the wheels at opposite ends of the truck, metal brake shoes associated with respective wheels for braking engagement therewith, shoes having composition braking faces associated with each of said braking discs for braking engagement therewith, and power means on said frame for simultaneous actuation of all of said brake shoes, said power means comprising an air cylinder and a hydraulic cylinder at each side of the truck, spaced cylinder levers connected respectively to the pistons of said cylinders, a connection between said cylinder levers, and an operating connection between each cylinder lever and the adjacent wheel brakes.

9. In a brake arrangement for a railway car truck, a frame, spaced supporting wheel and axle assemblies, a brake disc mounted adjacent each wheel, a metal brake shoe supported for engagement with the periphery of each wheel, a brake shoe having a composition lined face supported for engagement with each brake disc, brake rigging associated with said wheel brakes and disc brakes respectively, and power means on said frame for simultaneous actuation of said wheel brakes and said disc brakes, said power means comprising an air cylinder and a hydraulic cylinder at each side of the truck, interconnected cylinder levers connected respectively to the pistons of said cylinders, and connections between said cylinder levers and said wheel brakes at opposite ends of the truck.

10. In a railway car truck, a frame, spaced supporting wheels and axles, brake discs mounted on axles at opposite ends of the truck, metal brake shoes associated with the wheels at opposite ends of the truck, and composition lined brake shoes associated with the discs at opposite ends of the truck, and power means mounted on said frame for simultaneous actuation of all of said shoes, said power means at each side of the truck comprising an air cylinder, a hydraulic cylinder associated therewith, interconnected cylinder levers connected respectively to the pistons of said cylinders, operative connections between said cylinder levers and the adjacent wheel brakes at opposite ends of the truck, and an operative connection between said hydraulic cylinder and said disc brakes.

11. In a brake arrangement for a railway car truck, a frame, spaced supporting wheel and axle assemblies, disc brakes and wheel brakes associated with each assembly, and power means at each side of the frame for actuating the adjacent rigging, said power means comprising an air cylinder and a hydraulic cylinder, cylinder levers connected respectively to said cylinders and connected to each other, each of said cylinder levers having an operative connection to the adjacent wheel brakes, and said hydraulic cylinder having an operative connection to actuating means for operating the disc brakes at the adjacent side of the truck.

12. In a brake arrangement for a railway car truck, a frame, supporting wheel and axle assemblies, wheel brakes and disc brakes associated with each assembly at each side of the truck, and operating means for the brakes at each side of the truck comprising an air cylinder, a hydraulic cylinder, live and dead cylinder levers connected respectively to the pistons of said cylinders and connected to each other, operative connections between said cylinder levers and the adjacent wheel brakes, actuating means for the adjacent disc brakes, and an operative connection between said hydraulic cylinder and said actuating means.

13. In a brake arrangement for a railway car truck, a truck frame, supporting wheel and axle assemblies, wheel brakes and disc brakes associated with each assembly at each side of the truck, and power means mounted on said truck frame at each side thereof for actuation of the adjacent disc brakes and wheel brakes, said power means comprising an air cylinder, a hydraulic cylinder, and an operative connection between said cylinders.

14. In a brake arrangement for a railway car truck, a truck frame, supporting wheel and axle assemblies, wheel brakes and disc brakes associated with each assembly at each side of the truck, and power means mounted on said truck frame at each side thereof for actuation of the adjacent disc brakes and wheel brakes, said power means comprising an air cylinder, a hydraulic cylinder, and an operative connection between said cylinders, said operative connection comprising cylinder levers connected respectively at corresponding ends to the pistons of said cylinders, a pull rod adjustably connecting said cylinder levers, and connections between said cylinder levers respectively and the adjacent wheel brakes.

15. In a brake arrangement for a railway car truck, a truck frame, supporting wheel and axle assemblies, wheel brakes and disc brakes associated with each assembly at each side of the truck, and power means mounted on said truck frame at each side thereof for actuation of the adjacent disc brakes and wheel brakes, said power means comprising an air cylinder, a hydraulic cylinder, and an operative connection between said cylinders, said operative connection comprising cylinder levers connected respectively at corresponding ends to the pistons of said cylinders, a pull rod adjustably connecting said cylinder levers, and connections between said cylinder levers respectively and the adjacent wheel brakes, actuating means for said disc brakes, and an operative connection between said hydraulic cylinder and said actuating means.

16. In a railway car truck, wheel and axle assemblies, wheel brakes and disc brakes for each side of said truck, and power means at each side of said truck for actuation of said brakes, each of said power means including an air cylinder and a hydraulic cylinder, an operative connection between said cylinders comprising a lever associated with each, actuating means for said wheel brakes connected to said levers, and an operative connection between said hydraulic cylinder and said disc brakes.

CARL E. TACK.